United States Patent [19]
Beauchet

[11] 3,967,856
[45] July 6, 1976

[54] FIXED-ADJUSTMENT HUB FOR SPOKED BICYCLE WHEELS

[75] Inventor: Jean Beauchet, Veyrier-du-Lac, France

[73] Assignee: Societe Nouvelle de Roulements, Annecy, France

[22] Filed: July 16, 1974

[21] Appl. No.: 488,982

[30] Foreign Application Priority Data
Oct. 10, 1973  France .............................. 73.36255

[52] U.S. Cl. ............................ 301/105 B; 308/192
[51] Int. Cl.² ........................................ B60B 27/00
[58] Field of Search ................ 308/192; 301/105 B, 301/105 R

[56] References Cited
UNITED STATES PATENTS

| | | | |
|---|---|---|---|
| 3,220,784 | 11/1965 | Kilmer | 301/105 B |
| 3,241,894 | 3/1966 | Duffy | 308/192 |

*Primary Examiner*—Stanley H. Tollberg
*Assistant Examiner*—D. W. Keen
*Attorney, Agent, or Firm*—Oblon, Fisher, Spivak, McClelland & Maier

[57] ABSTRACT

A fixed-adjustment hub for spoked bicycle wheels wherein two flanges are held on by the tension of the spokes, two bearings are held in a tubular crosspiece, and one bearing is held so as not to slide on the hub axle. The hub is of a fixed-adjustment type, the disassembly of which requires removal of the spokes.

5 Claims, 2 Drawing Figures

FIXED-ADJUSTMENT HUB FOR SPOKED BICYCLE WHEELS

BACKGROUND OF THE INVENTION

1. Field of the Invention

The present invention relates generally to spoked bicycle wheels and more particularly to a fixed adjustment hub for spoked bicycle wheels.

2. Description of the Prior Art

Bicycle wheel hubs of known type have an axle threaded at the two ends thereof on which are screwed two cylindrical parts each having an annular groove serving as the inner race for an oblique contact bearing. A tubular part has flat flanges at the two ends thereof carrying two outer races which together with the grooves in the cylindrical parts and the balls form two oblique contact bearings of the hub. The spokes are hooked to the periphery of the flange and attached to the rim to form the wheel.

The adjustment of the wheel hub for the known type of bicycle is effected by screwing in or unscrewing of one of the two mentioned cylindrical parts on the threaded axle. This adjustment is rather difficult to achieve. Furthermore, every time the wheel is removed, a cylindrical part can be accidentally tightened or loosened and the hub is then out of adjustment.

The quality of oblique contact bearings realized in this construction of a wheel hub is not excellent and sealing against dust and water is imperfect.

Moreover, the dimension of the spoke-holding flange differs among the makers and types of bicycles and, consequently, a great many models of hubs must be made to satisfy the demand.

SUMMARY OF THE INVENTION

Accordingly, it is an object of the invention to provide a wheel hub which does not go out of adjustment while the hub is connected to the rim of the bicycle wheel by the spokes.

Briefly, in accordance with the present invention, the foregoing and other objects are obtained by providing a fixed-adjustment bicycle wheel hub having two outer flanges to which the spokes are hooked and which hold between them by the tension of the spokes an assembly formed by a cylindrical crosspiece, an axle-threaded at the two ends thereof for mounting the wheel in a self-evident manner on the bicycle and two bearings, the inner race of at least one of the bearings being held so as not to slide on the threaded axle.

In a second embodiment of the invention, two oblique contact bearings are used. The two flanges then apply pressure through the rolling elements of the bearings from the outer to the inner races of the bearings both of which are held fixed on the hub axle by two retaining rings provided on the axle.

The cylindrical crosspiece is then assembled with the axle, the bearings and the flanges such that it is likewise clamped between the flanges.

The flanges described in the second embodiment of the invention can be the outer races of the aforementioned oblique contact bearing.

The dissociation of the bearing elements and the holding elements on the one hand, and externally, the flanges and the crosspiece, permits use of different outer diameter flanges with the same rotating assembly, as well as the use of the materials best suited to the function of each element.

The hub described is, of course, compatible with all the known arrangements for attaching hubs to bicycles, whether by nuts, butterfly nuts, or by quick attachment with an eccentric device, requiring a hollow axle in such case.

It is likewise possible, in all embodiments of hubs conforming to the invention, to fasten a free wheel on one of the flanges of the hub, either by screw threads according to the traditional method or by lateral attachment by means of bolts.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and in which.

DETAILED DESCRIPTION OF THE PREFERRED EMBODIMENT

Figure 1:
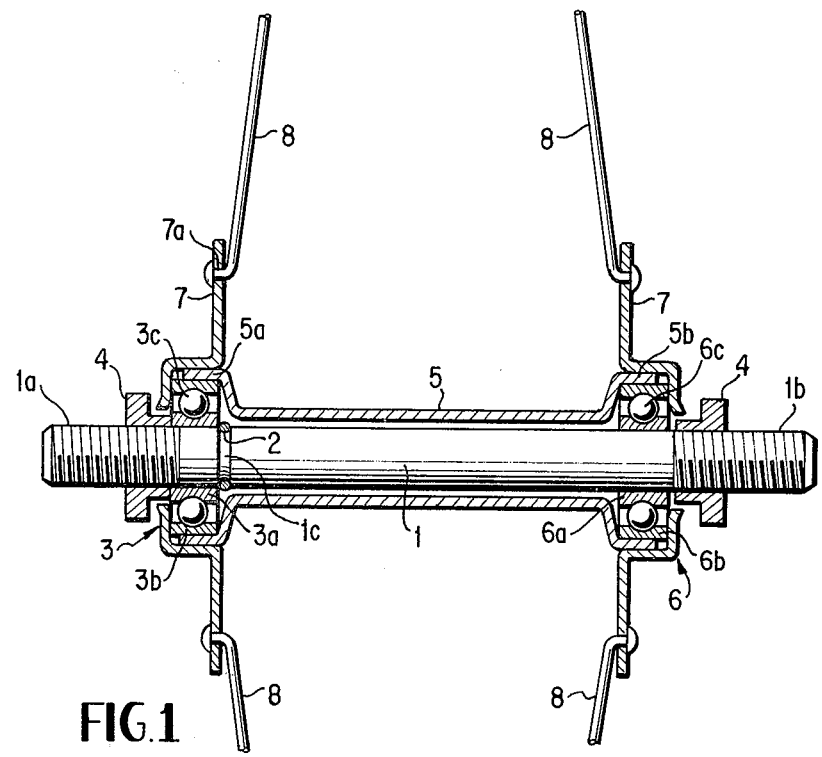
FIG. 1 shows a section of a first embodiment of a hub conforming to the present invention.

With reference first to FIG. 1, an axle of a hub has two threaded ends 1a and 1b, and an annular groove 1c relatively close to the base of the thread at end 1a.

Against a retaining ring 2 set in groove 1c is butted the inner race 3a of a ball bearing protected by the deflector 3c, this inner race 3a being held fixed on the axle 1 by a nut 4 screwed on the threaded end 1a of axle 1.

The outer race 3b of bearing 3 is pressed into the cylindrical end 5a of a tubular crosspiece 5.

In the other cylindrical end 5b of the crosspiece 5 is contained with a sliding fit the outer race 6b of a second protected bearing similar to the aforementioned bearing 3, and which is likewise provided with a protecting deflector 6c.

The inner race 6a of bearing 6 can slide on a non-threaded part of the axle 1 and is at a certain distance from a second nut 4 screwed to the base of the threads on the threaded end 1b of the axle 1.

Two flanges 7 capable of sliding on the cylindrical terminations 5a of the tubular crosspiece 5 are pressed firmly against the outer races 3b and 6b of bearings 3 and 6, towards one another by the tension of the spokes 8 hooked in the holes 7a of flanges 7 the inner shape of which permits realizing a baffle between them and the nuts 4, which improves the sealing of the bearings.

Figure 2:
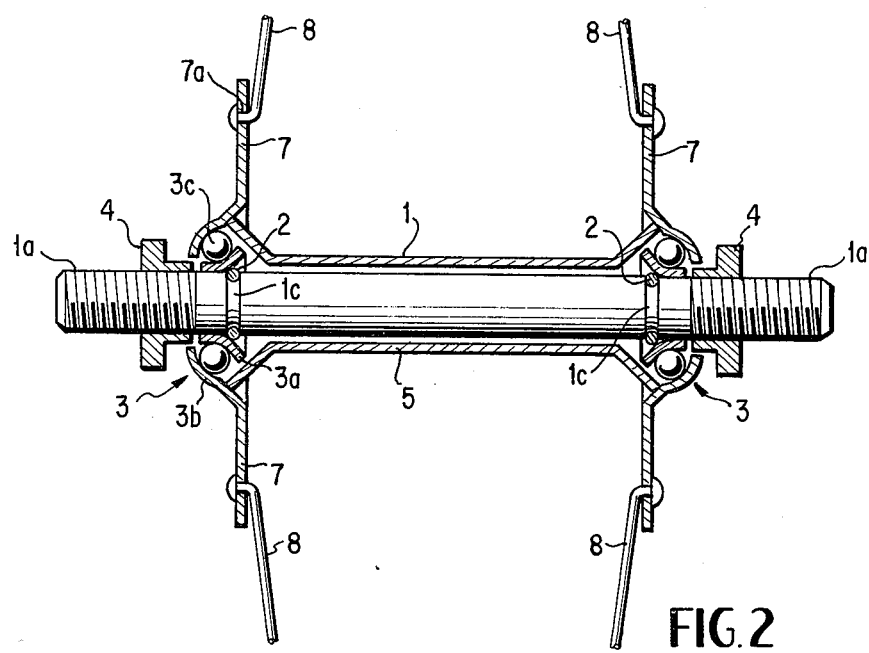
FIG. 2 shows a section of a second embodiment of a hub, of lighter construction, conforming to the present invention.

FIG. 2 shows a second embodiment using a lighter hub compared to the version shown in FIG. 1.

An axle 1 with two threaded ends 1a and 1b is shown having two annular grooves 1c at a certain distance from the aforementioned threaded ends 1a and 1b. The annular grooves 1c each is likewise provided with a retaining ring 2.

The bearings 3 are of the oblique contact type, that is, the bearing races are disposed substantially parallel to each other and are inclined relative to the axle 1, and possess an inner race 3a butted against a retaining ring 2. The outer race 3b is an annular inner portion of flange 7. The balls 3c are located between the races 3a and 3b of the oblique contact bearings.

In this embodiment, the nuts 4 are screwed to the base of the threads on the threaded ends 1a and 1b of the axle 1 at a certain distance from the inner race 3a of the bearings 3.

The tubular part 5 rests at its ends against the inner sides of the flanges 7 and must be of the right length to assure proper tightness of the races of the oblique contact bearings 3 and to give the necessary play in functioning.

It may be noted that in the two embodiments described above, the adjustment of the hub cannot be affected in the process of removing the wheel and that to change the adjustment, the hub must be entirely disassembled, which likewise requires removal of the spokes 8.

Obviously, many modifications and variations of the present invention are possible in light of the above teachings. It is to be understood therefore that within the scope of the appended claims, the invention may be practiced otherwise than as specifically described herein.

What is claimed as new and desired to be secured by Letters Patent of the United States is:

1. A fixed-adjustment hub for spoked bicycle wheels comprising:
   two outer flanges on which the spokes are hooked;
   an axle threaded at the two ends thereof;
   two bearings disposed about said axle near said two threaded ends thereof for mounting the wheel on a bicycle;
   a cylindrical crosspiece containing said threaded axle and said two bearings, the latter of which are disposed within diametrically expanded portions of the two ends of said cylindrical crosspiece;
   the assembly formed by said crosspiece and said two bearings being held between said two flanges by the tension of the spokes;
   at least one of the inner races of said bearings being held, so as not to slide on said threaded axle, between a retaining ring and a first nut for mounting said wheel upon said bicycle, while the second one of said bearings can slide upon a smooth part of said axle;
   a second nut, for also mounting said wheel upon said bicycle, being screwed to the base of the threads of said axle to within a certain distance from the inner race of said second bearing; and
   said outer bearing races being interposed between said flanges and said diametrically expanded portions of said crosspiece.

2. A fixed-adjustment hub for spoked bicycle wheels, comprising:
   two outer flanges upon which the spokes are hooked;
   an axle threaded at the two ends thereof;
   two oblique contact bearings for mounting the wheel on a bicycle, each of said bearings including an outer race intergrally formed with one of said flanges and an inner race slidably disposed upon said axle;
   a cylindrical cross-piece containing said threaded axle and said two bearings;
   the assembly formed by said crosspiece and said two bearings being held between said two flanges by the tension of said spokes, wherein said two flanges press, through the balls of said bearings, the outer races of said bearings axially inwardly against the inner races of said bearings, each of the latter being held against sliding on said hub axle by two retaining rings provided upon said axle; and
   said cylindrical crosspiece being assembled with said axle, said bearings, and said flanges in such a manner that said crosspiece is likewise clamped between said two flanges while assuring the necessary play in functioning.

3. A fixed-adjustment hub for spoked wheels as set forth in claim 2, wherein an inner portion of said flange serves as a race for the balls of said oblique contact bearings.

4. A fixed-adjustment hub for spoked wheels as set forth in claim 2, wherein one of said flanges has means for attaching a free wheel.

5. A fixed-adjustment hub for spoked wheels as set forth in claim 2, wherein the internal shape of said flanges permits realization of a baffle between them and the nuts which improves the sealing of the bearing.

* * * * *